July 15, 1924. 1,501,384
J. F. WILLS
COMBINATION BAIT CUP AND TRIGGER
Filed May 14, 1923
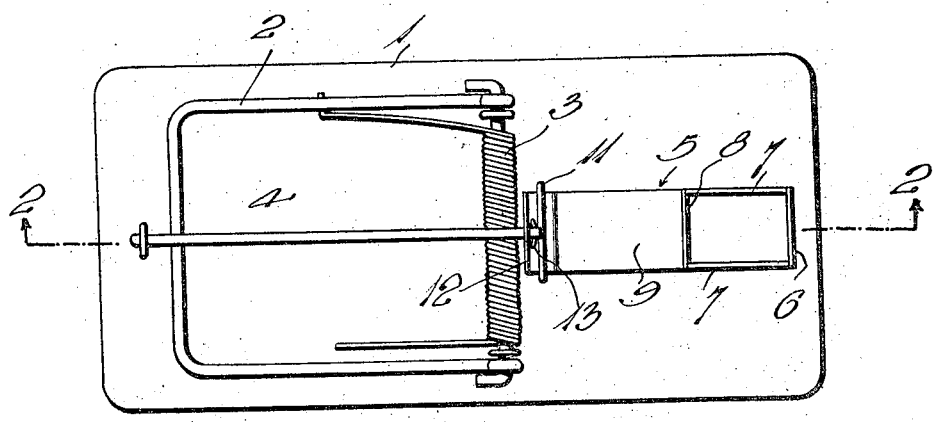
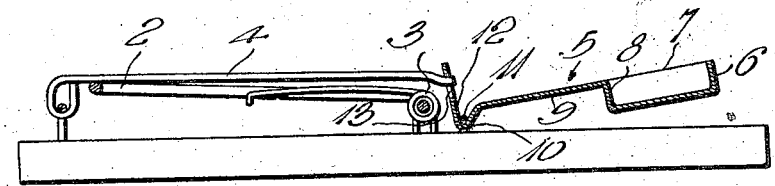
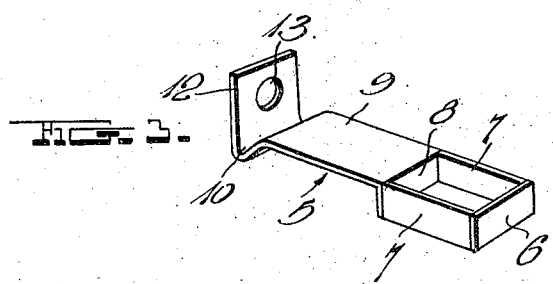
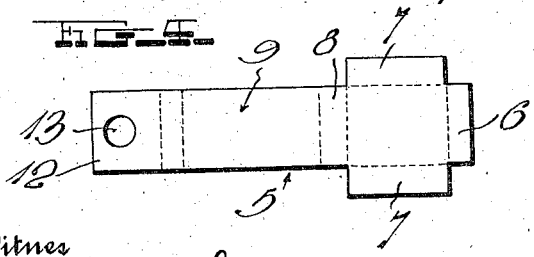
Witness
H. Woodard
Inventor
J. F. WILLS
By H. R. Wilson Yates
Attorneys Patented July 15, 1924.

1,501,384

UNITED STATES PATENT OFFICE.

JOSEPH FRANKLIN WILLS, OF NORTH LITTLE ROCK, ARKANSAS.

COMBINATION BAIT CUP AND TRIGGER.

Application filed May 14, 1923. Serial No. 638,779.

*To all whom it may concern:*

Be it known that I, JOSEPH FRANKLIN WILLS, a citizen of the United States, residing at North Little Rock, in the county of Pulaski and State of Arkansas, have invented certain new and useful Improvements in a Combination Bait Cup and Trigger; and I do declare the following to be a full, clear, and exact description of the invention, such as will enable others skilled in the art to which it appertains to make and use the same.

My invention relates more particularly to rat and mouse traps of the type provided with a U-shaped bail or jaw operable by a coiled spring to strike upon a horizontal base, being normally held in set position by a pivoted latch which co-operates with a bait-holding trigger. It is the object of my invention to provide an improved form of trigger and bait-holder which includes a cup constructed in a novel manner. This cup permits the use of a granular bait such as corn meal and can also be used to tightly hold solid bait, such as cheese or meat, which can be pressed down upon the edges of the cup and forced into the latter. While I am aware that I am not the originator of a trap trigger having a cup to hold the bait, it is my aim to provide an exceptionally simple and inexpensive construction, whereby the trigger and the bait cup may be stamped from a single strip of sheet metal.

With the foregoing in view, the invention resides in the novel subject matter hereinafter described and claimed, the description being supplemented by the accompanying drawing.

Figure 1 is a plan view of a trap having a trigger and bait cup constructed in accordance with my invention.

Figure 2 is a longitudinal sectional view as indicated by line 2—2 of Fig. 1 with the base shown in elevation.

Figure 3 is a perspective view of the combined bait cup and trigger.

Figure 4 is a plan view of the sheet metal blank from which the cup and trigger are formed.

In the drawing above briefly described, the numeral 1 designates a base of a well known form of mouse or rat trap. Pivoted upon this base is a U-shaped jaw 2 having an operating spring 3. At 4 is shown the usual pivoted latch for co-action with a trigger to hold the jaw 2 in set position. In constructing the trigger, I make use of an elongated strip of metal 5 which is provided near one end 6 with a pair of opposed rectangular wings 7, said end 6 and wings 7 being bent upwardly at right angles to provide one end and the two sides of a rectangular bait cup. The portion of the strip adjacent the inner ends of the sides 7, is bent upwardly to provide the inner end 8 of the cup and then extends horizontally from this end, forming a trigger arm 9. The end of this arm remote from the bait cup, is depressed to provide a transverse channel 10 to receive the crown of a staple 11 by means of which the trigger is pivoted to the base 1. From the channel 10, the metal strip extends upwardly as indicated at 12 and is formed with an opening 13 co-operable with the free end of the latch arm 4, for the purpose of holding the latter in the position shown.

The bait cup when constructed as shown and described forms a deep, tight receptacle for holding a considerable quantity of corn meal or similar bait, for the use of which the trap is particularly designed. The entire top of the receptacle being left open for readily filling the cup and free access to the bait by the rodent.

By constructing the trigger and bait cup in the manner shown and described, it may also be easily and inexpensively manufactured and marketed, and will be highly efficient and in every way desirable. As excellent results have been obtained from the details disclosed, these exact details are preferably followed, but within the scope of the invention as claimed, minor changes may be made.

I claim:

A combined bait cup and trigger for mouse and rat traps comprising a strip of sheet metal bent downwardly and then upwardly at its inner end for pivotal connection with the bottom of the trap, and bent downwardly near its outer end and then upwardly at its extreme outer end to form the opposite ends of a rectangular bait cup; said strip having a pair of opposed integral wings on its side edges between said ends of the cup, said wings being bent upwardly to form the sides of the cup, thereby providing a deep, tight cup the entire top of which is open for the reception and holding of a comparatively large quantity of finely ground bait.

In testimony whereof I have hereunto affixed my signature.

JOSEPH FRANKLIN WILLS.